(12) United States Patent
Ma et al.

(10) Patent No.: US 7,478,903 B2
(45) Date of Patent: Jan. 20, 2009

(54) INK SET FOR INKJET PRINTING, INKJET PRINTER INCLUDING THE INK SET, AND METHOD OF INKJET PRINTING USING THE INK SET

(75) Inventors: Zeying Ma, San Diego, CA (US); Stephen W. Bauer, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 443 days.

(21) Appl. No.: 11/263,668

(22) Filed: Oct. 31, 2005

(65) Prior Publication Data
US 2007/0097193 A1 May 3, 2007

(51) Int. Cl.
*C09D 11/00* (2006.01)
(52) U.S. Cl. ....................................... 347/100
(58) Field of Classification Search ................... 347/100
See application file for complete search history.

(56) References Cited

U.S. PATENT DOCUMENTS

| | | | |
|---|---|---|---|
| 4,614,967 A | 9/1986 | Sayanagi | |
| 4,812,899 A | 3/1989 | Kueppers | |
| 4,878,977 A | 11/1989 | Kueppers | |
| 5,108,504 A | 4/1992 | Johnson et al. | |
| 5,118,350 A | 6/1992 | Prasad | |
| 5,143,547 A | 9/1992 | Kappele | |
| 5,145,519 A | 9/1992 | Kappele | |
| 5,185,034 A | 2/1993 | Webb et al. | |
| 5,273,573 A | 12/1993 | Kappele | |
| 5,528,377 A | 6/1996 | Hutcheson | |
| 5,534,051 A | 7/1996 | Lauw | |

(Continued)

FOREIGN PATENT DOCUMENTS

EP    1 489 150    12/2004

(Continued)

OTHER PUBLICATIONS

Anon, Scitex Follows the Sign of the Times with Billboard Poster Printer:, Lithoweek, vol. 16, No. 28, Jul. 14, 1992, (Abstract, 1 pg.).

(Continued)

*Primary Examiner*—Manish S Shah
*Assistant Examiner*—Laura E Martin

(57) ABSTRACT

An ink set for inkjet printing includes a cyan ink having a first hue angle h° value between approximately 200 and approximately 260, a magenta ink having a second hue angle h° value between approximately 320 and approximately 10, a yellow ink having a third hue angle h° value between approximately 80 and approximately 120, an ink selected from the group consisting of orange and red inks having a fourth hue h° value between approximately 10 and approximately 80, a green ink having a fifth hue h° value between approximately 120 and approximately 200, an ink selected from the group consisting of blue and violet inks having a sixth hue h° value between approximately 260 and approximately 320, and at least one matte black ink having an average carbon black particle size of from about 70 to about 200 nm and a first lightness L* value, and at least one photoblack ink having an average carbon black particle size of from about 20 to about 130 nm and a second lightness L* value.

32 Claims, 7 Drawing Sheets

U.S. PATENT DOCUMENTS

| | | | |
|---|---|---|---|
| 5,563,724 | A | 10/1996 | Boll et al. |
| 5,687,300 | A | 11/1997 | Cooper |
| 5,745,120 | A | 4/1998 | De Baer et al. |
| 5,751,326 | A | 5/1998 | Bernasconi |
| 5,772,742 | A | 6/1998 | Wang |
| 5,851,273 | A | 12/1998 | Morris et al. |
| 5,858,075 | A | 1/1999 | Deardurff et al. |
| 5,888,284 | A | 3/1999 | Engel |
| 5,892,891 | A | 4/1999 | Dalal et al. |
| 6,001,161 | A | 12/1999 | Evans et al. |
| 6,053,969 | A | 4/2000 | Lauw et al. |
| 6,069,190 | A | 5/2000 | Bates et al. |
| 6,152,999 | A | 11/2000 | Erdtmann et al. |
| 6,168,892 | B1 | 1/2001 | Ohara et al. |
| 6,183,548 | B1 | 2/2001 | Erdtmann et al. |
| 6,203,953 | B1 * | 3/2001 | Dalal .................. 430/47.2 |
| 6,214,099 | B1 | 4/2001 | Ueda et al. |
| 6,352,806 | B1 | 3/2002 | Dalal |
| 6,389,161 | B1 | 5/2002 | Krabbenhoft |
| 6,402,823 | B1 | 6/2002 | Garcia Sainz et al. |
| 6,459,501 | B1 | 10/2002 | Holmes |
| 6,506,239 | B1 | 1/2003 | Osumi et al. |
| 6,508,549 | B1 * | 1/2003 | Romano et al. ............ 347/100 |
| 6,521,030 | B1 | 2/2003 | Stoffel |
| 6,540,329 | B1 | 4/2003 | Kaneko et al. |
| 6,540,821 | B2 | 4/2003 | Adamic et al. |
| 6,582,070 | B2 | 6/2003 | Takada et al. |
| 6,610,130 | B2 | 8/2003 | Engel |
| 6,682,589 | B2 | 1/2004 | Morris et al. |
| 6,695,444 | B2 | 2/2004 | Leu et al. |
| 2001/0027734 | A1 | 10/2001 | Geisenberger et al. |
| 2002/0163655 | A1 * | 11/2002 | Zhou ..................... 358/1.4 |
| 2003/0007023 | A1 | 1/2003 | Barclay |
| 2003/0035034 | A1 * | 2/2003 | Fukumoto et al. .......... 347/86 |
| 2003/0056687 | A1 * | 3/2003 | Sano .................... 106/31.6 |
| 2003/0109600 | A1 * | 6/2003 | Shirota et al. ............ 523/160 |
| 2003/0110980 | A1 | 6/2003 | Thornberry et al. |
| 2003/0116055 | A1 | 6/2003 | Kubota et al. |
| 2003/0159616 | A1 | 8/2003 | Wang et al. |
| 2003/0189626 | A1 * | 10/2003 | Kataoka et al. ............ 347/98 |
| 2004/0030001 | A1 | 2/2004 | Ma et al. |
| 2005/0235867 | A1 * | 10/2005 | Jackson et al. ......... 106/31.27 |

FOREIGN PATENT DOCUMENTS

| | | |
|---|---|---|
| EP | 1 559 758 | 8/2005 |
| JP | 2000273374 | 10/2000 |
| JP | 2000336294 | 12/2000 |

OTHER PUBLICATIONS

Eggleston P., "The Future of Color Printing: Beyond CMYK", Adv. Imaging, vol. 16, No. 4, Apr. 2001, (Abstract, 1 pg).

Clariant, "The Source of Ink Jet Printing Excellence" (DP 8518 E), Sep. 2003, (24 pgs).

Inter Search Report, May 2007, Yildirim.

* cited by examiner

INK SET FOR INKJET PRINTING, INKJET PRINTER INCLUDING THE INK SET, AND METHOD OF INKJET PRINTING USING THE INK SET

BACKGROUND

An inkjet printing system generally includes a printhead and an ink supply which supplies liquid ink to the printhead. The printhead ejects ink drops through a plurality of orifices or nozzles and toward a print media, such as a sheet of paper, so as to print onto the print media. Typically, the nozzles are arranged in one or more arrays such that properly sequenced ejection of ink from the nozzles causes characters or other images to be printed upon the print media as the printhead and the print media are moved relative to each other.

In general, inkjet inks are either dye-based or pigment-based. Both are typically prepared in an ink vehicle that contains the dye and/or the pigment. Dye-based inkjet inks generally use a colorant which is dissolved in the ink vehicle and pigment-based inks generally use a colorant that is insoluble in the ink vehicle, but suspended or dispersed in the form of small particles.

Perceived color quality of inkjet inks can be characterized using any one of several color space systems, such as Munsell or CIELAB, as is well known in the art. With respect to the Munsell color space, a given color is defined using three terms, namely Hue (H), Value (V), and Chroma (C). With respect to the CIELAB color space, a color is defined using three terms $L^*$, $a^*$, and $b^*$. With the CIELAB system, $L^*$ defines the lightness of a color and ranges from 0 (black) to 100 (white). In addition, the terms $a^*$ and $b^*$ may be used to define the hue and chroma of a color, where $a^*$ ranges from a negative number (green) to a positive number (red) and $b^*$ ranges from a negative number (blue) to a positive number (yellow). The additional terms of $h°$ (hue angle) and $C^*$ (chroma) are also used to further describe a given color, as is known to those skilled in the art. As such, the Munsell H, V, and C values or the CIELAB $L^*$, $a^*$, and $b^*$ values can be used to calculate a volume of color space that a specific ink set can produce, whereby the larger the color space volume the more colors the ink set is capable of producing.

Desirable properties of inkjet inks include good crusting resistance, good stability, proper viscosity, proper surface tension, little color-to-color bleed, rapid dry time, no deleterious reaction with printhead components, high solubility of the dyes in the ink vehicle, consumer safety, low strike through, high color saturation, good dot gain, and suitable color characteristics. Furthermore, the durability of the printed image, for example, light and water fastness, also contributes to the quality of a printed inkjet image.

Known inkjet inks may possess one or more of the above described properties. Few inkjet inks, however, possess all of these properties since an improvement in one property often results in the degradation of another property. Accordingly, efforts continue in developing ink formulations that have improved properties while minimizing the degradation of others. However, challenges still remain to further improve the image quality and lighffastness of inkjet inks without sacrificing pen performance and/or reliability.

SUMMARY

One aspect of the present invention provides an ink set for inkjet printing. The ink set includes a cyan ink having a first hue angle $h°$ value between approximately 200 and approximately 260, a magenta ink having a second hue angle $h°$ value between approximately 320 and approximately 10, a yellow ink having a third hue angle $h°$ value between approximately 80 and approximately 120, an ink selected from the group consisting of orange and red inks having a fourth hue angle $h°$ value between approximately 10 and approximately 80, a green ink having a fifth hue angle $h°$ value between approximately 120 and approximately 200, and an ink selected from the group consisting of blue and violet inks having a sixth hue angle $h°$ value between approximately 260 and approximately 320, and at least one matte black ink having an average carbon black particle size of from about 70 to about 200 nm and a first lightness $L^*$ value, and at least one photoblack ink having an average carbon black particle size of from about 20 to about 130 nm and a second lightness $L^*$ value.

DETAILED DESCRIPTION

In the following detailed description, reference is made to the accompanying drawings which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
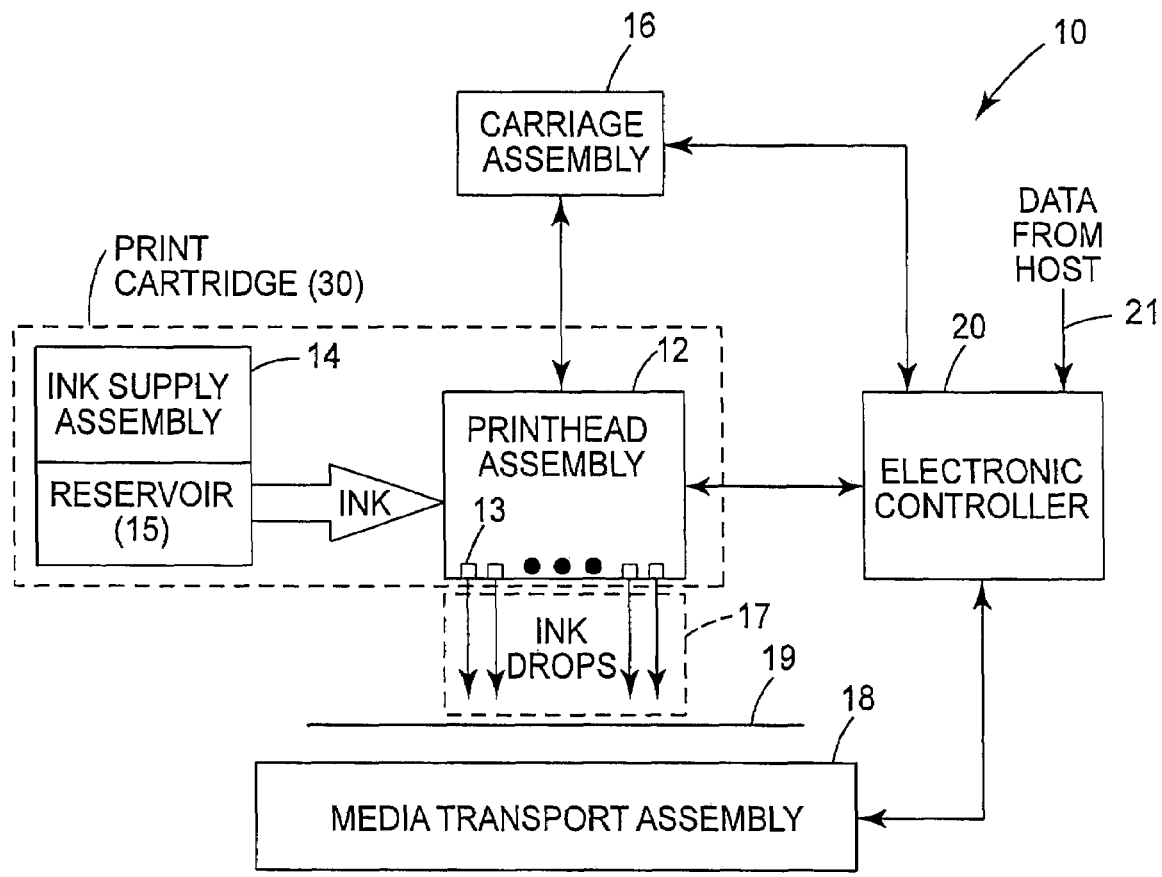
FIG. 1 is a block diagram illustrating one embodiment of an inkjet printing system.

FIG. 1 illustrates one embodiment of a portion of an inkjet printing system 10. Inkjet printing system 10 includes an inkjet printhead assembly 12, an ink supply assembly 14, a carriage assembly 16, a media transport assembly 18, and an electronic controller 20. Inkjet printhead assembly 12 includes one or more printheads which eject drops of ink through a plurality of orifices or nozzles 13.

In one embodiment, the drops of ink are directed toward a medium, such as a print media 19, so as to print onto print media 19. Nozzles 13 may be arranged in one or more columns or arrays such that properly sequenced ejection of ink from nozzles 13 causes characters, symbols, and/or other graphics or images to be printed upon print media 19 as inkjet printhead assembly 12 and print media 19 are moved relative to each other.

Print media 19 may include any type of suitable sheet material, such as paper, card stock, envelopes, labels, transparencies, Mylar, and the like. Print media 19 may include a cut-sheet material or a continuous form or continuous web print media such as a continuous roll of unprinted paper.

Ink supply assembly 14 supplies ink to inkjet printhead assembly 12 and includes a reservoir 15 for storing ink. As such, in one embodiment, ink flows from reservoir 15 to inkjet printhead assembly 12. In one embodiment, inkjet printhead assembly 12 and ink supply assembly 14 are housed together in an inkjet print cartridge or pen, as identified by dashed line 30. In another embodiment, ink supply assembly 14 is separate from inkjet printhead assembly 12 and supplies ink to inkjet printhead assembly 12 through an interface connection, such as a supply tube. In either embodiment, reservoir 15 of ink supply assembly 14 may be removed, replaced, and/or refilled.

Carriage assembly 16 positions inkjet printhead assembly 12 relative to media transport assembly 18, and media transport assembly 18 positions print media 19 relative to inkjet printhead assembly 12. As such, a print region 17 within which inkjet printhead assembly 12 deposits ink drops is defined adjacent to nozzles 13 in an area between inkjet printhead assembly 12 and print media 19. In one embodiment, print media 19 is advanced through print region 17 during printing by media transport assembly 18.

Electronic controller 20 communicates with inkjet printhead assembly 12, carriage assembly 16, and media transport assembly 18. Electronic controller 20 receives data 21 from a host system, such as a computer, and may include memory for temporarily storing data 21. Data 21 may be sent to inkjet printing system 10 along an electronic, infrared, optical or other information transfer path. Data 21 represents, for example, an image, graphics, or pattern to be printed. As such, data 21 forms a print job for inkjet printing system 10 and includes one or more print job commands and/or command parameters.

In one embodiment, electronic controller 20 provides control of inkjet printhead assembly 12 including timing control for ejection of ink drops from nozzles 13. As such, electronic controller 20 defines a pattern of ejected ink drops which form characters, symbols, and/or other graphics or images on print media 19. Timing control and, therefore, the pattern of ejected ink drops, is determined by the print job commands and/or command parameters. In one embodiment, logic and drive circuitry forming a portion of electronic controller 20 is located on inkjet printhead assembly 12. In another embodiment, logic and drive circuitry forming a portion of electronic controller is located off inkjet printhead assembly 12.

Figure 2:
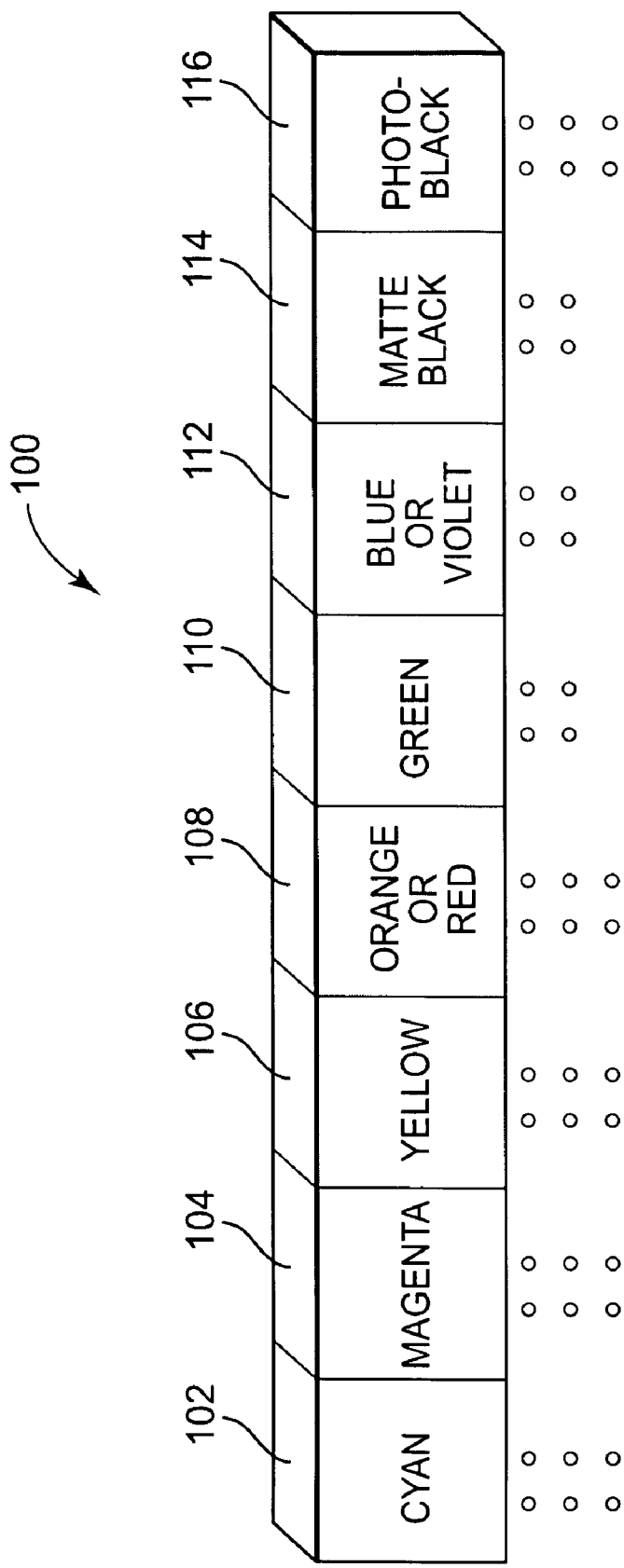
FIG. 2 is a schematic illustration of one embodiment of an ink set including cyan ink, magenta ink, yellow ink, an ink selected from orange and red inks, green ink, an ink selected from blue and violet inks, a matte black ink, and a photoblack ink.

FIG. 2 illustrates one embodiment of an ink set 100 for inkjet printing system 10. In one embodiment, ink set 100 is an eight ink set including a cyan ink 102 having a hue angle h° value between approximately 200 and approximately 260, a magenta ink 104 having a hue angle h° value between approximately 320 and approximately 10, a yellow ink 106 having a hue angle h° value between approximately 80 and approximately 120, an ink 108 selected from the group consisting of orange and red inks having a hue angle h° value between approximately 10 and approximately 80, a green ink 110 having a hue angle h° value between approximately 120 and approximately 200, an ink 112 selected from the group consisting of blue and violet inks having a hue angle h° value between approximately 260 and approximately 320, at least one matte black ink 114 having an average carbon black particle size of from about 70 to about 200 nm and a first lightness L* value, and at least one photoblack ink 116 having an average carbon black particle size of from about 20 to about 130 nm and a second lightness L* value.

The ink set of the present invention may be provided in a variety of pen configurations such as single color pens, dual chamber pens, tri-chamber pens, brick heads, or other pen configurations, without limitation. In one embodiment, ink set 100 is provided by a series of tri-chamber inkjet pens or cartridges, each of such pens including separate chambers for each of the inks. Thus, in one embodiment, ink set 100 is provided by a tri-chamber inkjet pen or cartridge for including a chamber for cyan ink 102, a chamber for magenta ink 104, a chamber for yellow ink 106, and a second tri-chamber pen including a chamber for orange or red ink 108. a chamber for green ink 110, a chamber for blue or violet ink 112, and a third tri-chamber including a chamber for matte black ink 114, and a chamber for photoblack ink 116 and a third unused chamber. In another embodiment, ink set 100 is provided by individual or separate inkjet pens or cartridges for each of the inks. Thus, in one embodiment, ink set 100 is provided by an inkjet pen including cyan ink 102, an inkjet pen including magenta ink 104, an ink jet pen including yellow ink 106, an ink jet pen including orange or red ink 108, an ink jet pen including green ink 110, an ink jet pen including blue or violet ink 112, an ink jet pen including matte black ink 114, and an ink jet pen including photoblack ink 116.

In one embodiment, the ink set may be provided in a brick head, where all colors are on the same head. Thus, in one embodiment, ink set 100 is provided by a brick head providing a chamber including cyan ink 102, a chamber including magenta ink 104, a chamber including yellow ink 106, a chamber including orange or red ink 108, a chamber including green ink 110, a chamber including blue or violet ink 112, a chamber including matte black ink 114, and a chamber including photoblack ink 116.

In another embodiment, the ink set may be provided in dual chamber pens. Thus, in one embodiment, ink set 100 is provided by a dual chamber inkjet pen or cartridge including a chamber for cyan ink 102 and a chamber for magenta ink 104. A second dual chamber pen includes a chamber for yellow ink 106 and a chamber for green ink 110. A third dual chamber pen includes a chamber for orange or red ink 108 and a chamber for blue or violet ink 112, and a fourth dual chamber pen including a chamber for matte black ink 114, and a chamber for photoblack ink 116.

Inks useful in ink set 100 include a mixture of a pigment or dye and an ink vehicle. Ink vehicles are well known in the art and refer to the vehicle in which a colorant, such as a selected pigment, dye or mixture of pigments or dyes, is placed to form the ink. A wide variety of ink vehicles in varying amounts may be used with the ink formulations of the present invention, without limitation. Such ink vehicles may include a mixture of a variety of different components including, for example, ingredients such as solvents, buffers, biocides, viscosity modifiers, surface-active agents (surfactants), salts, metal chelators, and water. When pigments are used, the pigment can be neutral, cationic, anionic, zwitterionic, hydrophilic and/or hydrophobic, without limitation. The pigment can be present with a chemical dispersant attached or such dispersant may be adsorbed, coated onto, or simply admixed with the pigment. The liquid vehicle can be configured to be stable with the pigment or dye colorant selected. The ink can include any color such as blue, brown, cyan, green, violet, magenta, red, orange and yellow, and black or white, as well as mixtures thereof.

In one embodiment, the ink set 100 includes both matte black ink 114 and photoblack ink 116. Matte black ink is useful on matte media. Matte black ink has a relatively large particle size carbon black pigment in a dispersion for best optical density (OD) and media surface retention when used on matte media. Matte black ink typically will reach an OD of at least 1.4 on fine art media and a maximum OD greater than 1.2 on plain paper. Matte black inks typically have a pigment load of greater than 3.5% and a higher pigment surface area to volume ratio than photoblack inks, and stay on the media surface. Photoblack inks are useful on all media, and have very small pigment particles to achieve a high gloss on even glossy microporous media, for example, alumina or silica based media. Photoblack inks typically have a maximum OD of more than 2.0 and have good smudge resistance on gloss media. Photoblack inks typically have a pigment loading of less than 3.5% and a low pigment surface area to volume ratio as compared to matte inks, and spread on and penetrate the media.

In one embodiment, the matte black ink has a particle size range of from 70 to 200 nm.

In one embodiment, matte black ink 114 present in ink set 100 has a particle range of 70 to 130 nm.

In one embodiment, matte black ink 114 present in ink set 100 has a particle range of 90 to 110 nm.

In one embodiment, photoblack ink 116 present in ink set 100 has a carbon black dispersion having a particle size range of from 20 to 130 nm.

In one embodiment, photoblack ink 116 present in ink set 100 has a particle size range of from 30 to 100 nm.

In one embodiment, photoblack ink 116 present in ink set 100 has a particle size range of from 50 to 90 nm.

Figure 3:
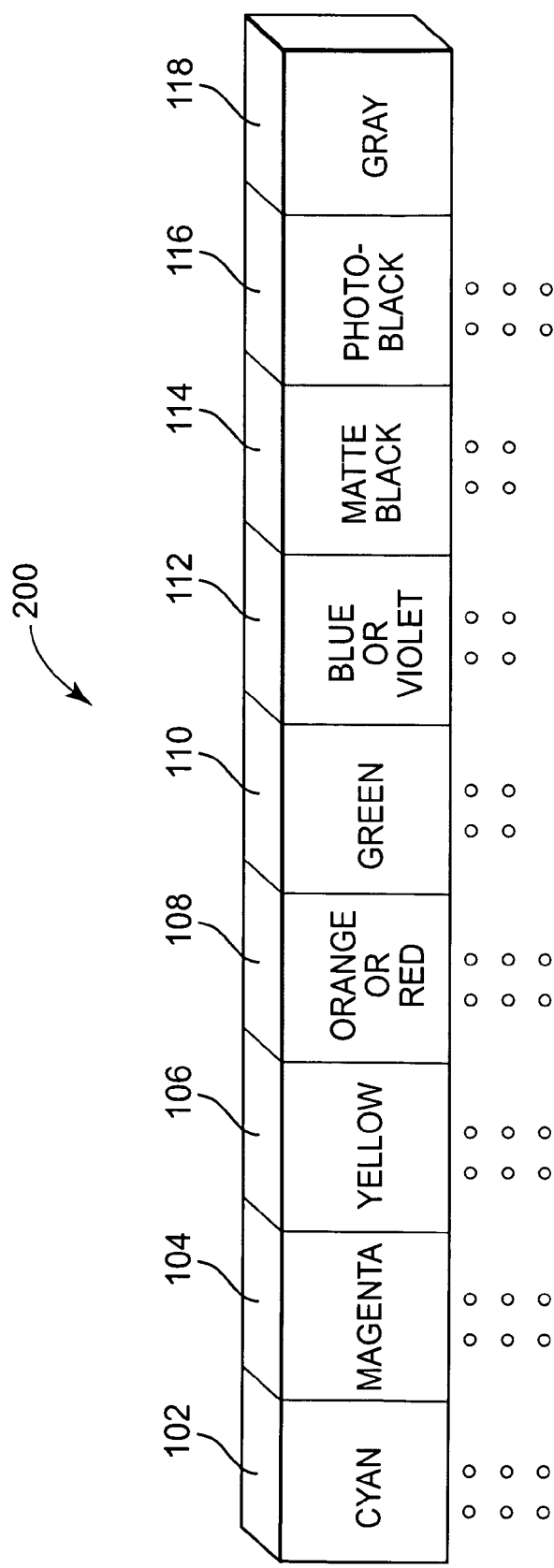
FIG. 3 is a schematic illustration of one embodiment of an ink set including cyan ink, magenta ink, yellow ink, an ink selected from orange and red inks, green ink, an ink selected from blue and violet inks, a matte black ink, a photoblack ink, and a gray ink.

FIG. 3 illustrates another embodiment of an ink set 200 for inkjet printing system 10. In one embodiment, ink set 200 is a nine ink set including cyan ink 102, magenta ink 104, yellow ink 106, ink 108 selected from the group consisting of orange and red ink, green ink 110, ink 112 selected from the group consisting of blue and violet inks, matte black ink 114, and photoblack ink 116 as described above, as well as a gray ink 118 having a lightness L* value less than that of photoblack ink 116.

FIG. 3 illustrates another embodiment of an ink set 200 for inkjet printing system 10. In one embodiment, ink set 200 is a nine ink set including cyan ink 102, magenta ink 104, yellow ink 106, ink 108 selected from the group consisting of orange and red inks, green ink 110, ink 112 selected from the group consisting of blue and violet inks, matte black ink 114, photoblack ink 116 and a gray ink 118 having a lightness L* value less than that of photoblack ink 116. The gray ink is selected from gray inks having a lightness L* value greater than that of the photoblack ink 116.

Figure 4:
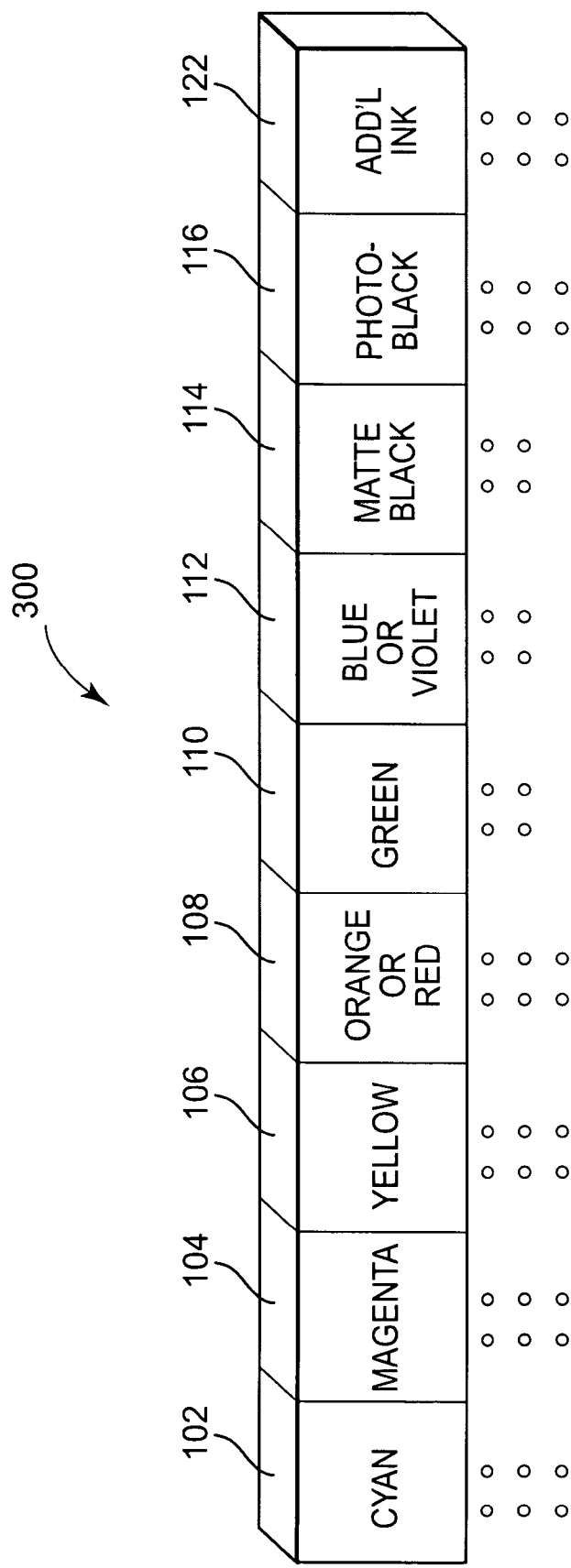
FIG. 4 is a schematic illustration of one embodiment of an ink set including cyan ink, magenta ink, yellow ink, an ink selected from orange and red inks, green ink, an ink selected from blue and violet inks, a matte black ink, a photoblack ink, and at least one additional ink.

FIG. 4 illustrates another embodiment of an ink set 300 for inkjet printing system 10. In one embodiment, ink set 300 is a nine ink set including cyan ink 102, magenta ink 104, yellow ink 106, ink 108 selected from the group consisting of orange and red inks, green ink 110, an ink 112 selected from the group consisting of blue and violet inks, matte black ink 114, and photoblack ink 116 and at least one additional ink 122 selected from a cyan ink, a magenta ink, an orange or red ink, a green ink, a blue or violet ink. In one embodiment, as described below, additional ink 122 has an independently selected hue angle.

In one embodiment of ink set 300, the additional ink 122 is an additional cyan ink having an independently selected hue angle h° value between approximately 200 and 260, and is selected from the group consisting of cyan inks having a hue angle h° value different from the hue angle h° value of cyan ink 102, cyan inks having a pigment load different than the cyan ink, and cyan inks having both a different pigment load and a different hue angle h° value from cyan ink 102.

In one embodiment of ink set 300, the additional ink 122 is an additional magenta ink having an independently selected hue angle h° value between approximately 320 and approximately 10. In one embodiment, the additional magenta ink is selected from the group consisting of magenta inks having a hue angle h° value different from the hue angle h° value of magenta ink 104, magenta inks having a pigment load different than magenta ink 104, and magenta inks having both a different pigment load and a different hue angle h° value from magenta ink 104.

In one embodiment of ink set 300, the additional ink 122 is an additional yellow ink. In one embodiment, the additional yellow ink has an independently selected hue angle h° value between approximately 80 and approximately 120, and is selected from the group consisting of yellow inks having a hue angle h° value different from the hue angle h° value of yellow ink 106, yellow inks having a pigment load different than yellow ink 106, and yellow inks having both a different pigment load and a different hue angle h° value from yellow ink 106.

In one embodiment of ink set 300, the additional ink 122 is an additional ink selected from the group consisting of orange and red inks having an independently selected hue angle h° value between approximately 10 and approximately 80. The additional orange or red ink is selected from the group consisting of orange and red inks having hue angle h° value different from the hue angle h° value of orange or red ink 108, orange and red inks having a pigment load different than orange or red ink 108, and orange or red inks having both a different pigment load and a different hue angle h° value from orange or red ink 108.

In one embodiment of ink set 300, the additional ink 122 is an additional green ink having an independently selected hue angle h° value between approximately 120 and approximately 200. In one embodiment, the additional green ink is selected from the group consisting of green inks having a hue angle h° value different from the hue angle h° value of green ink 110, green inks having a pigment load different than green ink 110, and green inks having both a different pigment load and a different hue angle h° value from green ink 110.

In one embodiment of ink set 300, the additional ink 122 is an additional ink selected from the group consisting of blue and violet inks having an independently selected hue h° value between approximately 260 and approximately 320. In one embodiment, the additional blue or violet ink is selected from the group consisting of blue and violet inks having a hue angle h° value different from the hue angle h° value of blue or violet ink 112, blue and violet inks having a different pigment load from blue or violet ink 112, and blue and violet inks having both a different pigment load and a different hue angle h° value from blue or violet ink 112.

In one embodiment of ink set 300, the additional ink 122 is a light ink selected from a light cyan ink, a light magenta ink, a light yellow ink, a light orange or red ink, a light green ink, and a light blue or violet ink. The additional light ink is distinguished by printed lightness values. In one embodiment, the lightness values are L* values as defined by the CIELAB color space system. The CIELAB color space system is based upon standards promulgated by the International Committee on Illumination or CIE (Commission Internationale de' L'Eclairage) in 1976. According to such standards, an L* value of 100 generally equals an ideal diffused perfectly white reflector. As such, with the CIELAB system, L* defines the lightness of a color and ranges from 0 (black) to 100 (white).

In one embodiment of ink set 300, the additional ink 122 is selected from a white ink and a clear gloss optimizer. A gloss optimizer is a colorless ink containing soluble binders, such as water soluble polymers, or dispersed latex in an ink vehicle to provide a smooth, glossy and clear surface to a printed substrate. The gloss optimizer is substantially free of colorants visible to the unaided eye. This means that typically from 0 to less than approximately 0.01% colorant is present. Dyes and pigments free of visible colorants may be included in gloss optimizers, including IR colorants, UV colorants and mixtures thereof. A typical formulation includes up to approximately 15% of the polymer or dispersed latex, up to approximately 50% of one or more co-solvents, and up to approximately 4% of one or more water soluble surfactants. The ink set uses the colorless ink gloss optimizer to fill in the spaces where there is an absence of color to promote a uniform glossy surface, and impart stain resistance to images.

Figure 5:
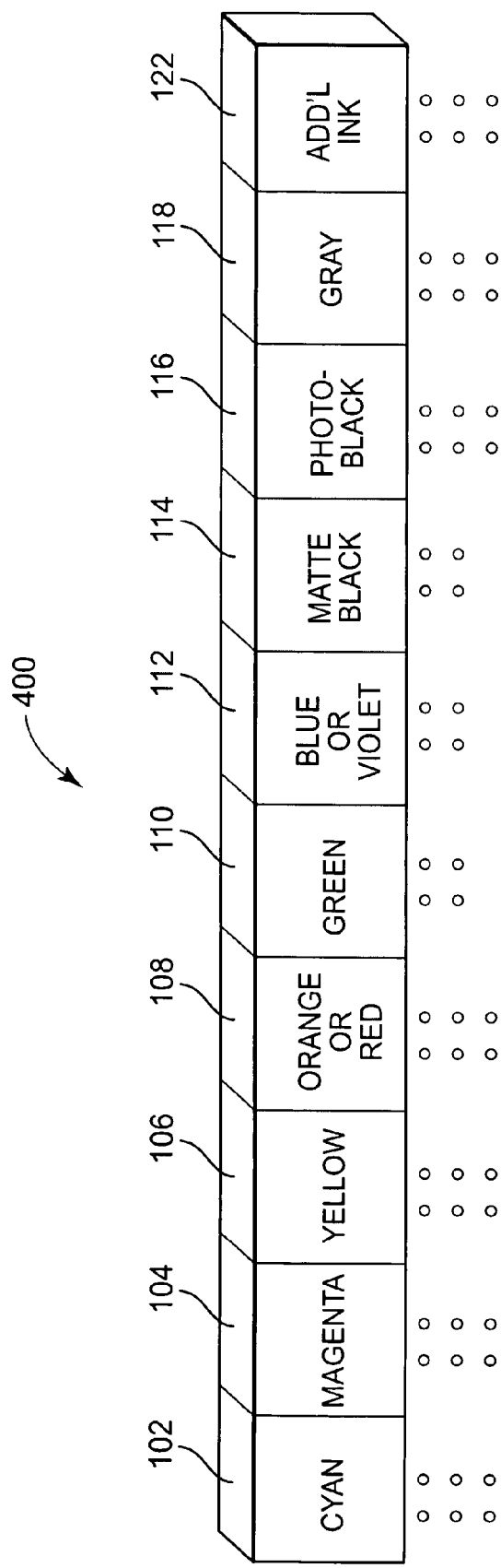
FIG. 5 is a schematic illustration of one embodiment of an ink set including cyan ink, magenta ink, yellow ink, an ink selected from orange and red inks, green ink, an ink selected from blue and violet inks, a matte black ink, a photoblack ink, a gray ink and at least one additional ink.

FIG. 5 illustrates another embodiment of an ink set 400 for inkjet printing system 10. In one embodiment, ink set 400 is a ten ink set including cyan ink 102, magenta ink 104, yellow ink 106, ink 108 selected from the group consisting of orange and red ink, green ink 110, ink 112 selected from the group consisting of blue and violet inks, matte black ink 114, photoblack ink 116, a gray ink 118 having a lightness L* value less than that of the lightness L* value of the photoblack ink, and additional ink 122.

In one embodiment of ink set 400, the additional ink 122 includes an additional cyan ink, an additional magenta ink, an additional yellow ink, an additional orange or red ink, an additional green ink, or an additional blue or violet ink, as described of above. In one embodiment of ink set 400, the additional ink 122 is a light ink selected from a light cyan ink, a light magenta ink, a light yellow ink, a light orange or red ink, a light green ink, and a light blue or violet ink, as described above. In one embodiment of ink set 400, the additional ink 122 is selected from a white ink and a clear gloss optimizer, as described above.

Figure 6:
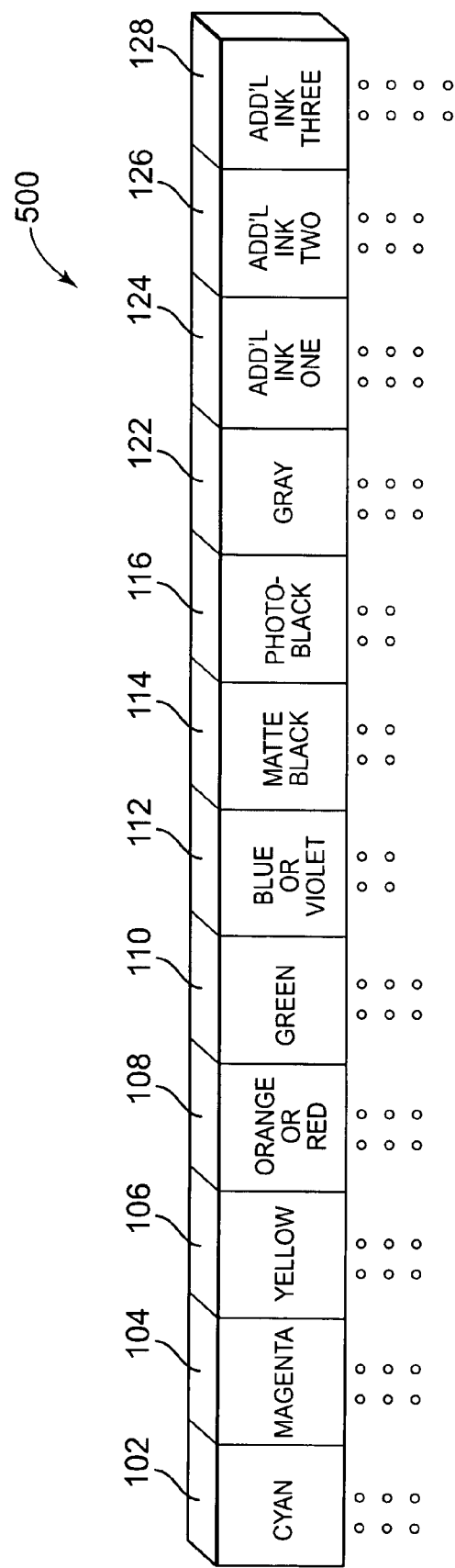
FIG. 6 is a schematic illustration of one embodiment of an ink set including cyan ink, magenta ink, yellow ink, an ink selected from orange and red inks, green ink, an ink selected from blue and violet inks, a matte black ink, a photoblack ink, a gray ink, and three additional inks.

FIG. 6 illustrates another embodiment of an ink set 500 for inkjet printing system 10. In one embodiment, ink set is a twelve ink set including cyan ink 102, magenta ink 104, yellow ink 106, ink 108 selected from the group consisting of orange and red inks, green ink 110, ink 112 selected from the group consisting of blue and violet inks, matte black ink 114, photoblack ink 116, a gray ink 118 having a lightness L* value less than that of photoblack ink 116, and three additional inks including additional ink 124, additional ink 126, and additional ink 128.

In one embodiment for ink set 500, the three additional inks are selected from light magenta, gloss optimizer, light cyan, light gray and white.

In one embodiment for ink set 500, the three additional inks are selected from light magenta, gloss optimizer, and light cyan.

Figure 7:
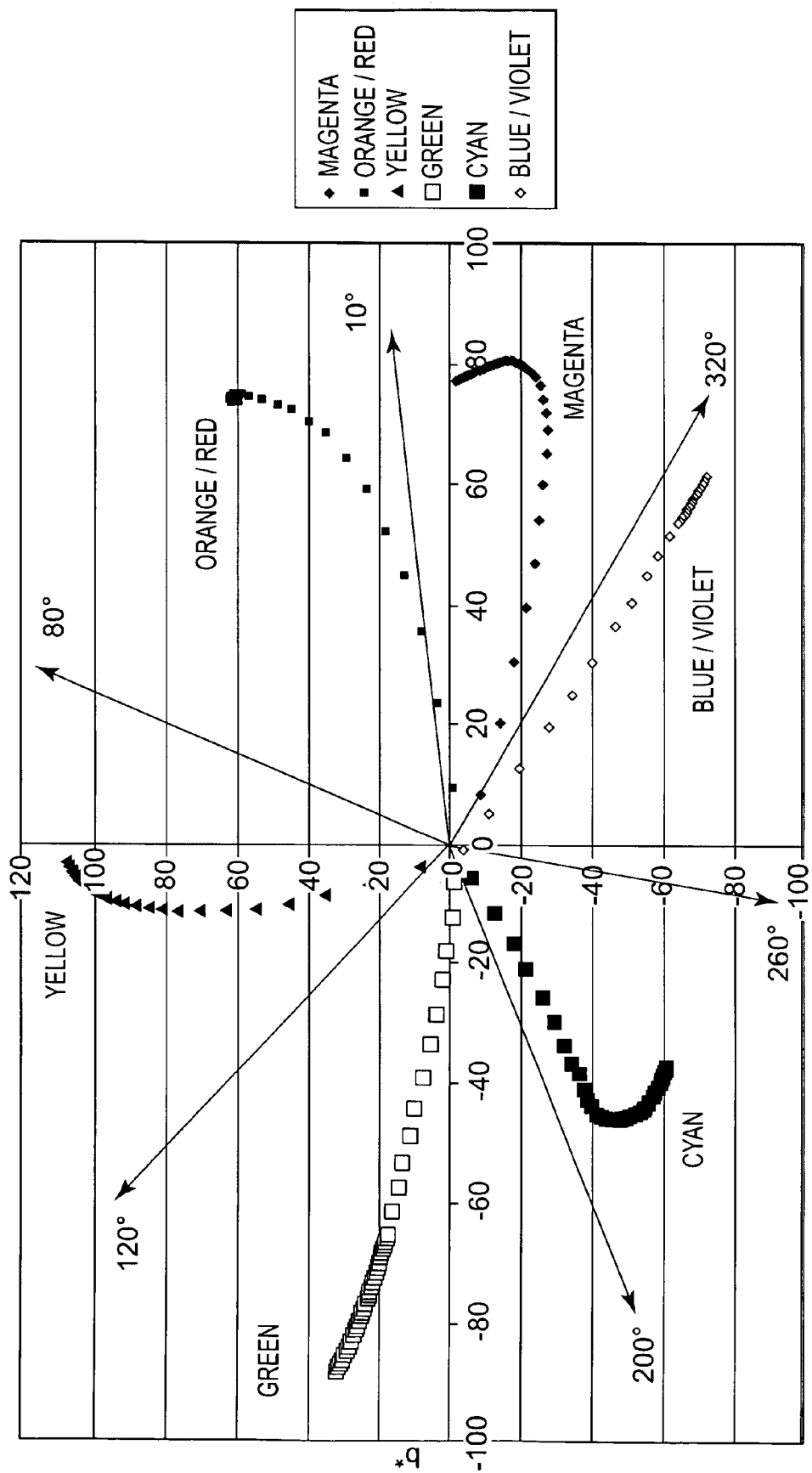
FIG. 7 is a graphic representation of hue angle zones used in the ink sets of the present invention.

FIG. 7 is a graphic representation of one embodiment of the hue angle h° value zones used in ink sets of the present invention with hue (a*) plotted on the x axis and chroma (b*) plotted on the y axis. The graph shows color zone limitations of the inks, including a cyan ink color zone having a hue angle h° value between approximately 200 and approximately 260, a magenta ink color zone having a hue angle h° value between approximately 320 and approximately 10, a yellow ink color zone having a hue angle h° value between approximately 80 and approximately 120, am orange and red ink color zone having a hue h° value between approximately 10 and approximately 80, a green ink color zone having a hue angle h° value between approximately 120 and approximately 200, and a blue and violet ink color zone having a hue angle h° value between approximately 260 and approximately 320. The graph illustrates the pigment colors as the amount of pigment per unit media area increases.

What is claimed is:

1. An ink set for inkjet printing, the ink set comprising an eight ink set:
    a cyan ink having a first hue angle h° value between approximately 200 and approximately 260;
    a magenta ink having a second hue angle h° value between approximately 320 and approximately 10;
    a yellow ink having a third hue angle h° value between approximately 80 and approximately 120;
    an ink selected from the group consisting of orange and red inks having a fourth hue h° value between approximately 10 and approximately 80;
    a green ink having a fifth hue angle h° value between approximately 120 and approximately 200;
    an ink selected from the group consisting of blue and violet inks having a sixth hue angle h° value between approximately 260 and approximately 320;
    at least one matte black ink having an average carbon black particle size of from about 70 to about 200 nm and a first lightness L* value;
    at least one photoblack ink having an average carbon black particle size of from about 20 to about 130 nm and a second lightness L* value; and
    at least one additional ink selected from the group consisting of blue and violet inks having an independently selected hue angle h° value between approximately 260 and approximately 320, said additional blue or violet ink selected from the group consisting of blue and violet inks having a hue angle h° value different from the blue or violet ink having the sixth hue angle h° value, blue and violet inks having a pigment load different than the blue or violet ink having the sixth hue angle h° value, and blue and violet inks having both a different pigment load and a different hue angle h° value from the blue or violet ink having the sixth hue angle h° value.

2. The ink set of claim 1, wherein the matte black ink has a first lightness L* value of less than 20.

3. The ink set of claim 1, wherein the photoblack ink has a second lightness L* value of less than 8.

4. The ink set of claim 1, further comprising:
    a gray ink having a third lightness L* value greater than that of the first lightness L* value and second lightness L* value.

5. The ink set of claim 4, further comprising:
    a gray ink having a fourth lightness L* value, said fourth lightness L* value being greater than that of the third lightness L* value.

6. The ink set of claim 1, further comprising:
    a clear gloss optimizer.

7. The ink set of claim 1, further comprising:
    a white ink.

8. The ink set of claim 1, further comprising:
    wherein at least one of said matte black ink and said photoblack ink includes a black dye or pigment and at least one other color dye or pigment.

9. The ink set of claim 1, further comprising:
    at least one additional cyan ink having an independently selected hue angle h° value between approximately 200 and approximately 260, said additional cyan ink selected from the group consisting of cyan inks having a hue angle h° value different from the first hue angle h° value, cyan inks having a pigment load different than the cyan ink having the first hue angle h° value, and cyan inks having both a different pigment load and a different hue angle h° value from the cyan ink having the first hue angle h° value.

10. The ink set of claim 1, further comprising:
at least one additional magenta ink having an independently selected hue angle h° value between approximately 320 and approximately 10, said additional magenta ink selected from the group consisting of magenta inks having a hue angle h° value different from the second hue angle h° value, magenta inks having a pigment load different than the magenta ink having the second hue angle h° value, and magenta inks having both a different pigment load and a different hue angle h° value from the magenta ink having the second hue angle h° value.

11. The ink set of claim 1, further comprising:
at least one additional yellow ink having an independently selected hue angle h° value between approximately 80 and approximately 120, said additional yellow ink selected from the group consisting of yellow inks having a hue angle h° value different from the third hue angle h° value, yellow inks having a pigment load different than the yellow ink having the third hue angle h° value, and yellow inks having both a different pigment load and a different hue angle h° value from the yellow ink having the third hue angle h° value.

12. The ink set of claim 1, further comprising:
at least one additional ink selected from the group consisting of orange and red inks having an independently selected hue angle h° value between approximately 10 and approximately 80, said additional orange or red ink selected from the group consisting of orange and red inks having a hue angle h° value different from the orange or red ink having the fourth hue angle h° value, orange and red inks having a pigment load different than the orange or red ink having a fourth hue angle h° value, and orange or red inks having both a different pigment load and a different hue angle h° value from the orange and red inks having the fourth hue angle h° value.

13. The ink set of claim 1, further comprising:
at least one additional green ink having an independently selected hue angle h° value between approximately 120 and approximately 200, said additional green ink selected from the group consisting of green inks having a hue angle h° value different from the fifth hue angle h° value, green inks having a pigment load different than the green ink having the fifth hue angle h° value, and green inks having both a different pigment load and a different hue angle h° value from the green ink having the fifth hue angle h° value.

14. The ink set of claim 1, wherein said matte black ink and said photoblack ink are pigment based inks and all other inks in said ink set are selected from the group consisting of dye-based inks and pigment based inks.

15. An inkjet printer, comprising:
a first ink chamber including a cyan ink having a first hue angle h° value between approximately 200 and approximately 260;
a second ink chamber including a magenta ink having a second hue angle h° value between approximately 320 and approximately 10;
a third ink chamber including a yellow ink having a third hue angle h° value between approximately 80 and approximately 120;
a fourth ink chamber including at least one ink selected from an orange ink and a red ink having a fourth hue angle h° value between approximately 10 and approximately 80;
a fifth ink chamber including a green ink having a fifth angle hue h° value between approximately 120 and approximately 200;
a sixth ink chamber including an ink selected from the group consisting of a blue ink and a violet ink having a sixth hue h° value between approximately 260 and approximately 320;
at least one matte black ink having an average carbon black particle size of from about 70 to about 200 nm and a first lightness L* value:
at least one photoblack ink having an average carbon black particle size of from about 20 to about 130 nm and a second lightness L* value; and
at least one additional ink selected from the group consisting of blue and violet inks having an independently selected hue angle h° value between approximately 260 and approximately 320, said additional blue or violet ink selected from the group consisting of blue and violet inks having a hue angle h° value different from the blue or violet ink having the sixth hue angle h° value, blue and violet inks having a pigment load different than the blue or violet ink having the sixth hue angle h° value, and blue and violet inks having both a different pigment load and a different hue angle h° value from the blue or violet ink having the sixth hue angle h° value.

16. The inkjet printer of claim 15, wherein the matte black ink has a first lightness L* value of less than 20.

17. The inkjet printer of claim 15, wherein the photoblack black ink has a first lightness L* value of less than 8.

18. The inkjet printer of claim 15, further comprising:
a gray ink having a third lightness L* value greater than that of the first lightness L* value and second lightness L* value.

19. The inkjet printer of claim 15, further comprising:
a white ink.

20. The inkjet printer of claim 15, further comprising:
a clear gloss optimizer.

21. The inkjet printer of claim 15, further comprising:
at least one additional cyan ink having an independently selected hue angle h° value between approximately 200 and approximately 260, said additional cyan ink being selected from the group consisting of cyan inks having a hue angle h° value different from the first hue angle h° value, cyan inks having a pigment load different than the cyan ink having the first hue angle h° value, and cyan inks having both a different pigment load and a different hue angle h° value from the cyan ink having the first hue angle h° value.

22. The inkjet printer of claim 15, further comprising:
at least one additional magenta ink having an independently selected hue angle h° value between approximately 320 and approximately 10, said additional magenta ink selected from the group consisting of magenta inks having a hue angle h° value different from the magenta ink having the second hue angle h° value, magenta inks having a pigment load different than the magenta ink having the second hue angle h° value, and magenta inks having both a different pigment load and a different hue angle h° value from the magenta ink having the second hue angle h° value.

23. The inkjet printer of claim 15, further comprising:
at least one additional yellow ink having an independently selected hue angle h° value between approximately 80 and approximately 120, said additional yellow ink selected from the group consisting of yellow inks having a hue angle h° value different the third hue angle h° value, yellow inks having a pigment load different than the yellow ink having the third hue angle h° value, and yellow inks having both a different pigment load and a different hue angle h° value from the yellow ink having the third hue angle h° value.

24. The inkjet printer of claim 15, further comprising:
at least one additional ink selected from the group consisting of orange and red inks having an independently selected hue angle h° value between approximately 10 and approximately 80, said additional orange or red ink selected from the group consisting of orange and red inks having a hue angle h° value different from the orange or red ink having the fourth hue angle h° value, orange and red inks having a pigment load different than the orange or red ink having the fourth hue angle h° value, and orange or red inks having both a different pigment load and a different hue angle h° value from the orange or red ink having the fourth hue angle h° value.

25. The inkjet printer of claim 15, further comprising:
at least one additional green ink having an independently selected hue angle h° value between approximately 120 and approximately 200, said additional green ink selected from the group consisting of green inks having a hue angle h° value different from the fifth hue angle h° value, green inks having a pigment load different than the green ink having the fifth hue angle h° value, and green inks having both a different pigment load and a different hue angle h° value from the green ink having the fifth hue angle h° value.

26. A method of inkjet printing on a print media, the method comprising:
providing an ink set for inkjet printing, the ink set comprising:
a cyan ink having a first hue angle h° value between approximately 200 and approximately 260,
a magenta ink having a second hue angle h° value between approximately 320 and approximately 10,
a yellow ink having a third hue angle h° value between approximately 80 and approximately 120,
an ink selected from the group consisting of orange and red inks having a fourth hue angle h° value between approximately 10 and approximately 80,
a green ink having a fifth hue angle h° value between approximately 120 and approximately 200,
an ink selected from the group consisting of blue and violet inks having a sixth hue angle h° value between approximately 260 and approximately 320,
at least one matte black ink having an average carbon black particle size of from about 70 to about 200 nm and a first lightness L* value,
at least one photoblack ink having an average carbon black particle size of from about 20 to about 130 nm and a second lightness L* value, and
at least one additional ink selected from the group consisting of a blue or violet ink having an independently selected hue angle h° value between approximately 260 and approximately 320; and
ejecting drops of at least one of the inks onto the print media.

27. The method of claim 26, wherein the matte black ink has a first lightness L* value of less than 20.

28. The method of claim 26, wherein the photoblack ink has a second lightness L* value of less than 8.

29. The method of claim 26, wherein the ink set further comprises:
a gray ink having a third lightness L* value greater than that of the second lightness L* value,
wherein ejecting drops includes ejecting drops of said gray ink.

30. The method of claim 26, wherein the ink set further comprises:
a white ink.

31. The method of claim 26, wherein the ink set further comprises:
a clear gloss optimizer.

32. The method of claim 26, wherein the ink set further comprises:
at least one additional ink selected from the group consisting of:
a cyan ink having an independently selected hue angle h° value between approximately 200 and approximately 260,
a magenta ink having an independently selected hue angle h° value between approximately 320 and approximately 10,
a yellow ink having an independently selected hue angle h° value between approximately 80 and approximately 120,
an orange or red ink having an independently selected hue angle h° value between approximately 10 and approximately 80, and
a green ink having an independently selected hue angle h° value between approximately 120 and approximately 200,
wherein ejecting drops includes ejecting drops of the at least one additional ink.

* * * * *

UNITED STATES PATENT AND TRADEMARK OFFICE
CERTIFICATE OF CORRECTION

PATENT NO. : 7,478,903 B2  Page 1 of 1
APPLICATION NO. : 11/263668
DATED : January 20, 2009
INVENTOR(S) : Zeying Ma et al.

It is certified that error appears in the above-identified patent and that said Letters Patent is hereby corrected as shown below:

In column 10, line 17, in Claim 15, after "value" delete ":" and insert -- ; --, therefor.

In column 10, line 36, in Claim 17, delete "black".

Signed and Sealed this

Twenty-second Day of June, 2010

David J. Kappos
*Director of the United States Patent and Trademark Office*